United States Patent
Zhou et al.

(10) Patent No.: US 10,078,491 B2
(45) Date of Patent: Sep. 18, 2018

(54) SOFTWARE CONFIGURABLE AIRCRAFT AUDIO CONTROL PANELS

(71) Applicants: Jiongmao Zhou, Shanghai (CN); Grant Lian, Shanghai (CN)

(72) Inventors: Jiongmao Zhou, Shanghai (CN); Grant Lian, Shanghai (CN)

(73) Assignee: Rockwell Collins, Inc., Cedar Rapids, IA (US)

( * ) Notice: Subject to any disclaimer, the term of this patent is extended or adjusted under 35 U.S.C. 154(b) by 472 days.

(21) Appl. No.: 14/799,817

(22) Filed: Jul. 15, 2015

(65) Prior Publication Data

US 2017/0017463 A1   Jan. 19, 2017

(51) Int. Cl.
  G06F 3/16   (2006.01)
  G06F 3/0482   (2013.01)
  G06F 3/0484   (2013.01)
  G06F 3/0481   (2013.01)

(52) U.S. Cl.
CPC .......... G06F 3/167 (2013.01); G06F 3/0482 (2013.01); G06F 3/04812 (2013.01); G06F 3/04842 (2013.01)

(58) Field of Classification Search
CPC .................................................. G08G 5/0021
See application file for complete search history.

(56) References Cited

U.S. PATENT DOCUMENTS

| 4,009,451 A * | 2/1977 | Moore ............... H03J 5/0272 331/116 R |
| 4,231,115 A * | 10/1980 | Henderson .......... H05K 5/0017 455/349 |
| 4,531,233 A * | 7/1985 | Nelson ................. H03J 1/14 455/173.1 |
| 6,112,141 A * | 8/2000 | Briffe .................. G01C 23/00 345/1.3 |
| 6,282,417 B1 * | 8/2001 | Ward .................. G08G 5/0013 455/431 |
| 6,405,107 B1 * | 6/2002 | Derman .............. G01C 21/005 340/3.5 |

(Continued)

OTHER PUBLICATIONS

FlightSim Developers, KA155 Nav-COM Transceiver, Apr. 2010, FSD International Inc., pp. 1-6.*

*Primary Examiner* — Justin S Lee
(74) *Attorney, Agent, or Firm* — Angel N. Gerdzhikov; Donna P. Suchy; Daniel M. Barbieri

(57) ABSTRACT

Software configurable aircraft audio control panels (ACPs) and methods for configuring such ACPs are disclosed. An ACP in accordance with the inventive concepts disclosed herein may include a display configured to provide a visual indication of a list of available voice channels and a list of navigation channels. The aircraft audio control panel may also include a plurality of channel-independent hardware control elements configured to receive a channel selection input from a user. The aircraft audio control panel may further include at least one processor in communication with the display and the plurality of channel-independent hardware control elements, the at least one processor configured to process the channel selection input and update the visual indication of the list of available voice channels and the list of navigation channels based on the channel selection input.

17 Claims, 18 Drawing Sheets

(56) References Cited

U.S. PATENT DOCUMENTS

| | | | |
|---|---|---|---|
| 9,116,524 B1* | 8/2015 | Barker | G01S 19/15 |
| 2002/0119758 A1* | 8/2002 | Gouillou | G08G 5/0008 |
| | | | 455/74 |
| 2003/0025682 A1* | 2/2003 | Dame | G08G 5/0021 |
| | | | 345/184 |
| 2008/0184166 A1* | 7/2008 | Getson | G01C 23/005 |
| | | | 715/810 |
| 2009/0306839 A1* | 12/2009 | Youngquist | G01K 7/021 |
| | | | 701/14 |
| 2012/0310450 A1* | 12/2012 | Srivastav | G08G 5/0021 |
| | | | 701/3 |
| 2015/0356873 A1* | 12/2015 | Kneuper | G08G 5/0021 |
| | | | 701/439 |

* cited by examiner

SOFTWARE CONFIGURABLE AIRCRAFT AUDIO CONTROL PANELS

BACKGROUND

Modern aircraft typically transmit and receive communication signals over multiple communication channels. A control panel located onboard an aircraft, typically referred to as an audio control panel (ACP), may be utilized to coordinate the selection and use of the various communication channels.

As the number of communication channels increases, the number of hardware control elements (e.g., knobs, buttons and the like) provided for selecting communication channels also increases, leading to a very crowded and non-intuitive ACP faceplate layout. In addition, changes to one or more channels (e.g., adding or removing one or more channels) may require a re-design of the ACP faceplate layout, increasing cost and cycle time needed to implement such changes. Further, ACPs often need to be customized for different aircraft platforms, which may contribute to increased cost, and in certain situations, may even require the customized ACPs to be re-certified due to hardware changes.

SUMMARY

In one aspect, embodiments of the inventive concepts disclosed herein are directed to an aircraft audio control panel. The aircraft audio control panel may include a display configured to provide a visual indication of a list of available voice channels and a list of navigation channels. The aircraft audio control panel may also include a plurality of channel-independent hardware control elements configured to receive a channel selection input from a user. The aircraft audio control panel may further include at least one processor in communication with the display and the plurality of channel-independent hardware control elements, the at least one processor configured to process the channel selection input and update the visual indication of the list of available voice channels and the list of navigation channels based on the channel selection input.

In a further aspect, embodiments of the inventive concepts disclosed herein are directed to an aircraft audio control panel. The aircraft audio control panel may include a display configured to provide a visual indication of a list of available voice channels and a list of navigation channels. The aircraft audio control panel may also include a plurality of channel-independent hardware control elements configured to receive a channel selection input from a user. The aircraft audio control panel may further include at least one processor in communication with the display and the plurality of channel-independent hardware control elements. The at least one processor may be configured to control the list of available voice channels and the list of navigation channels indicated on the display. The at least one processor may be further configured to process the channel selection input and update the visual indication of the list of available voice channels and the list of navigation channels based on the channel selection input.

In another aspect, embodiments of the inventive concepts disclosed herein are directed to an aircraft audio control panel. The aircraft audio control panel may include a display configured to provide a visual indication of a list of available voice channels and a list of navigation channels. The aircraft audio control panel may also include a plurality of channel-independent hardware control elements configured to receive a channel selection input from a user, wherein the channel selection input is specified for selecting at least one of: a transmission channel among the list of available voice channels, a receive channel among the list of available voice channels, and a navigation channel among the list of available navigation channels. The aircraft audio control panel may further include at least one processor in communication with the display and the plurality of channel-independent hardware control elements. The at least one processor may be configured to control the list of available voice channels and the list of navigation channels indicated on the display. The at least one processor may be further configured to process the channel selection input and update the visual indication of the list of available voice channels and the list of navigation channels based on the channel selection input.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments of the inventive concepts disclosed herein are directed to software configurable aircraft audio control panels (ACPs) and methods for configuring such ACPs to reduce cost and clutter. More specifically, an ACP in accordance with the inventive concepts disclosed herein may utilize a display in conjunction with a few number of hardware control elements to facilitate selection and use of various communication channels. Customization of the ACP may be accomplished through software configuration, affording customers more flexibility in terms of the controls while effectively lowering cost and enabling more standardization along a product line from a manufacturing and design perspective. It is contemplated that software configurable ACPs in accordance with the inventive concepts disclosed herein may also be more portable, allowing the ACPs to be configured to support different (or newly added) channels without needing to change any of the hardware control elements.

Figure 1:
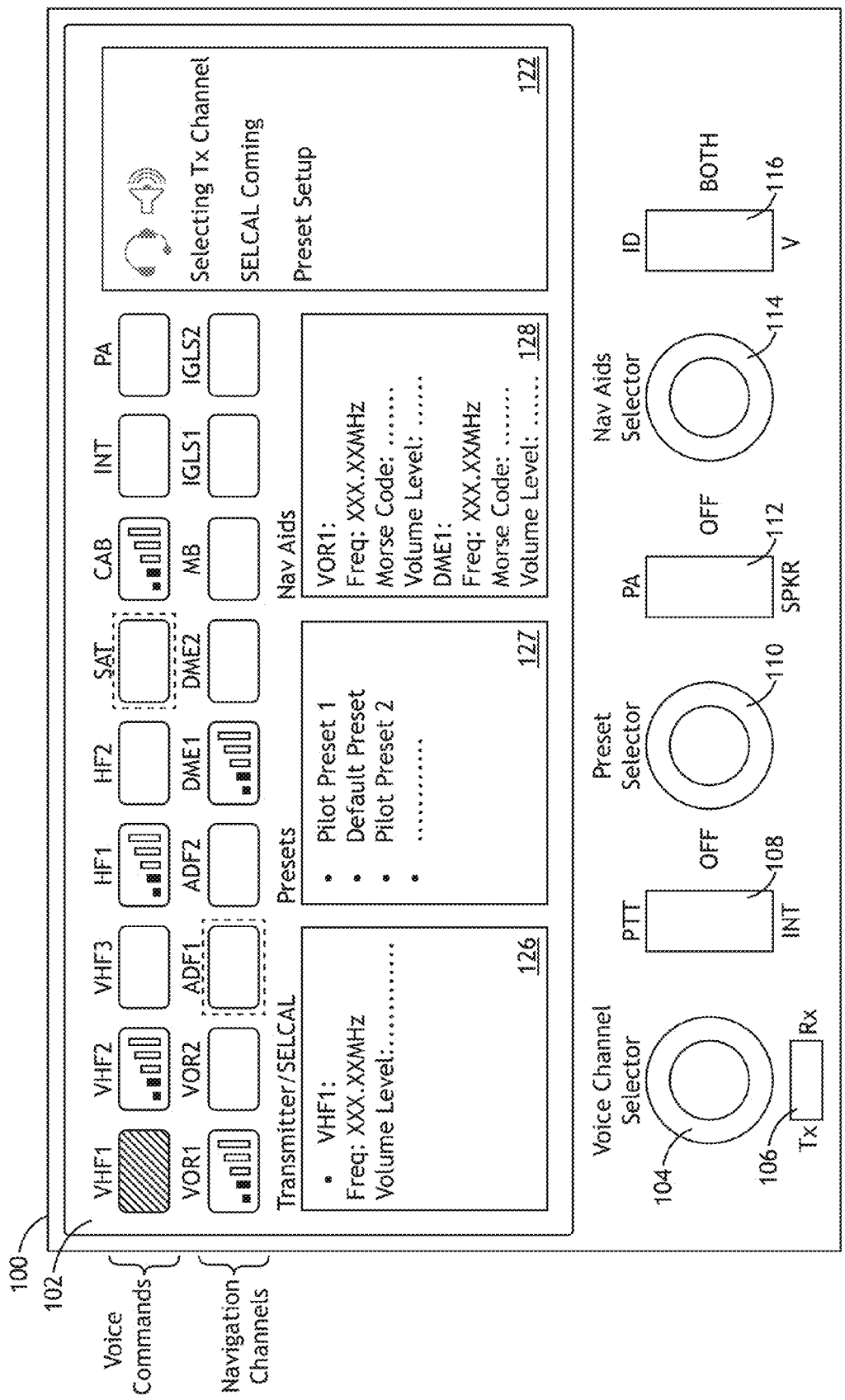
FIG. 1 is an illustration depicting a faceplate of an audio control panel (ACP) according to an exemplary embodiment of the inventive concepts disclosed herein.

Referring to FIG. 1, an illustration depicting a faceplate of an ACP 100 according to an exemplary embodiment of the inventive concepts disclosed herein is shown. The faceplate of the ACP 100 may include a display 102 and only a few exemplary hardware control elements 104-116. The display 102 may be implemented using a liquid crystal display, a light emitting diode display, a field emission display, as well as other types of panel displays. It is contemplated that the display 102 may support touch sensing capabilities, which may further reduce the number of hardware control elements needed on the faceplate of the ACP 100. However, for illustrative purposes, non-touch screen implementations will be described first and some alternative implementations utilizing touch screens will be described later.

As shown in FIG. 1, the display 102 may present a user with a list of available voice channels and a list of available navigation channels. It is to be understood that while the list of available voice channels and the list of available navigation channels are presented horizontally (as rows) in FIG. 1, such an arrangement is exemplary and is not meant to be limiting. It is contemplated that a list of available channels may be arranged in various other manners (e.g., as a column, a grid or the like) without departing from the broad scope of the inventive concepts disclosed herein, as long as the channels are presented on the display 102 as graphical user interface elements (or icons) instead of being channel-specific hardware buttons.

The ACP 100 may allow the user to select one or more voice channels and one or more navigation channels to monitor, and an indicator may be displayed for each of the selected channels. In the example depicted in FIG. 1, voice channels VHF2, HF1, and CAB, and navigation channels VOR1 and DME1 are indicated as the selected channels. It is to be understood that the various acronyms for the various voice and navigation channels are shown for illustrative purposes. It is contemplated that different (or additional) voice and navigation channels not specifically shown in the figure may also be supported without departing from the broad scope of the inventive concepts disclosed herein.

It is also contemplated that while the indicators for the selected channels may be implemented as simple ON/OFF indicators, the fact that they are implemented as display elements (as opposed to hardware indicators on a conventional ACP) allows them to carry additional information that may be useful to the user. For instance, as shown in FIG. 1, each indicator may be associated with a volume icon that indicates the volume setting of a particular selected channel. It is contemplated that other auxiliary information may be displayed in a similar manner without departing from the broad scope of the inventive concepts disclosed herein.

It is also noted that in certain implementations, the display 102 may be large enough to provide one or more information windows, which may be utilized to present information regarding transmitter and/or selective-calling channels (depicted as information window 126), predefined settings or "presets" (depicted as information window 127), navigation channel selection (depicted as information window 128), as well as other status updates and/or notifications (depicted as information window 122). It is contemplated that implementations of one or more of such information windows may be optional. Each of these information windows will be described in details later along with specific exemplary use cases.

The hardware control elements 104-116 included on the faceplate of the ACP 100 may be implemented using standard rotary knobs, rocker switches, as well as other types of hardware control elements (e.g., dials, push buttons or the like). It is noted that the hardware control elements 104-116 are not channel specific (i.e., they are channel-independent), so they do not need to be changed even if one or more channels supported by the ACP 100 are changed. In the example shown in FIG. 1, the faceplate of the ACP 100 may include a double pole rotary selector 104 configured for selecting voice channels, a double pole rotary selector 114 configured for selecting navigation channels, a double pole rotary selector 110 configured for selecting user-defined presets, and a plurality of rocker switches 106, 108, 112, and 116 configured for engaging/disengaging various operations supported by the ACP 100.

For illustrative purposes, various use cases will be presented below to show the various operations supported by the ACP 100. It is to be understood that the use cases presented below are merely exemplary and are not meant to be limiting. It is contemplated that detailed implementations may vary from these use cases without departing from the broad scope of the inventive concepts disclosed herein.

Figure 2:
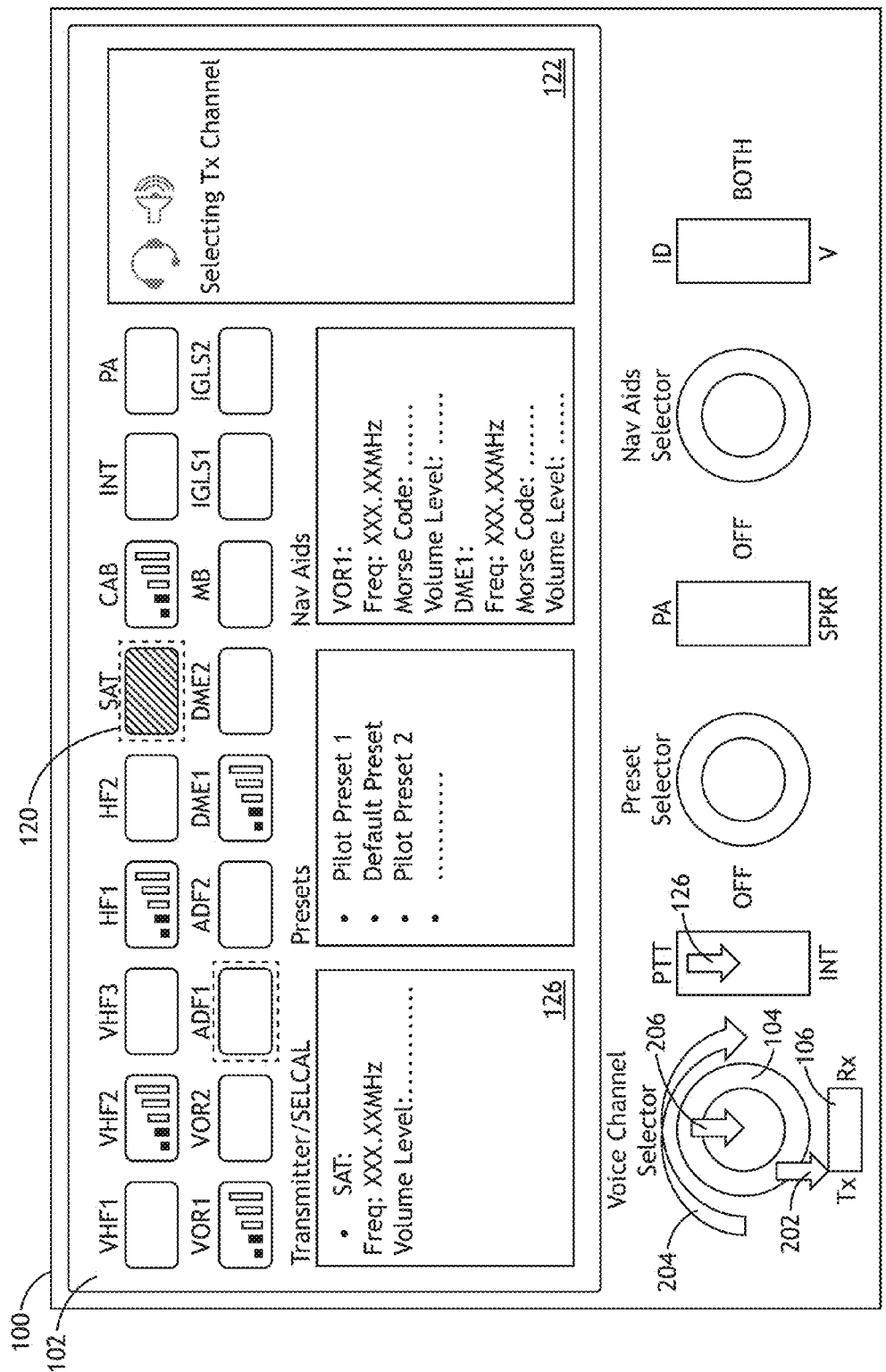
FIG. 2 is an illustration depicting selection of a transmission channel utilizing an ACP according to an exemplary embodiment of the inventive concepts disclosed herein.

FIG. 2 shows a sequence of actions that may be utilized to select a transmission channel. More specifically, the double pole rotary selector 104 may include two rotary knobs, where the outer knob may be rotated to control a cursor 120 that can move across the various audio channels and the inner knob may be pressed to select/de-select a particular channel based on the location of the cursor 120. To facilitate the selection of the transmission channel, the rocker switch 106 may respond to a user input and switch the ACP 100 to a transmission channel selection mode (step 202). In certain implementations, optional status information may be displayed in the status window 122 to provide a visual indication/confirmation to the user of the selected mode. It is to be understood, however, that display of the status information is not required.

While operating in the transmission channel selection mode, the outer knob of the double pole rotary selector 104 may respond to a user generated rotation input and move the cursor 120 accordingly (step 204). Suppose the SAT channel is the channel of choice for transmissions, the user may move the cursor 120 over the SAT channel and press the inner knob of the double pole rotary selector 104 once. The SAT channel may then be selected as the transmission channel in response to the press input of the inner knob (step 206).

It is contemplated that once a channel is selected as the transmission channel (e.g., SAT channel in this example), a transmission channel indicator may be assigned to that channel to provide a visual indication. In addition, detailed information about the selected transmission channel (e.g., frequency, volume setting and the like) may also be presented in the information window 126 (if the window is provided), which may serve as a reminder or as a verification for the user. Once the selection is confirmed, the user may press and hold the "push to talk" (or PTT) momentary button (step 208) and talk over the selected transmission channel.

It is contemplated that in certain implementations, the inner knob of the double pole rotary selector 104 may also respond to a rotation input, allowing the user to adjust the volume on the selected channel by rotating the inner knob. Further, it is to be understood that the selection process described above may be repeated in order to select a different transmission channel. It is noted that because only one transmission channel can be selected at a time, a newly selected transmission channel may automatically replace the previously selected transmission channel.

Figure 3:
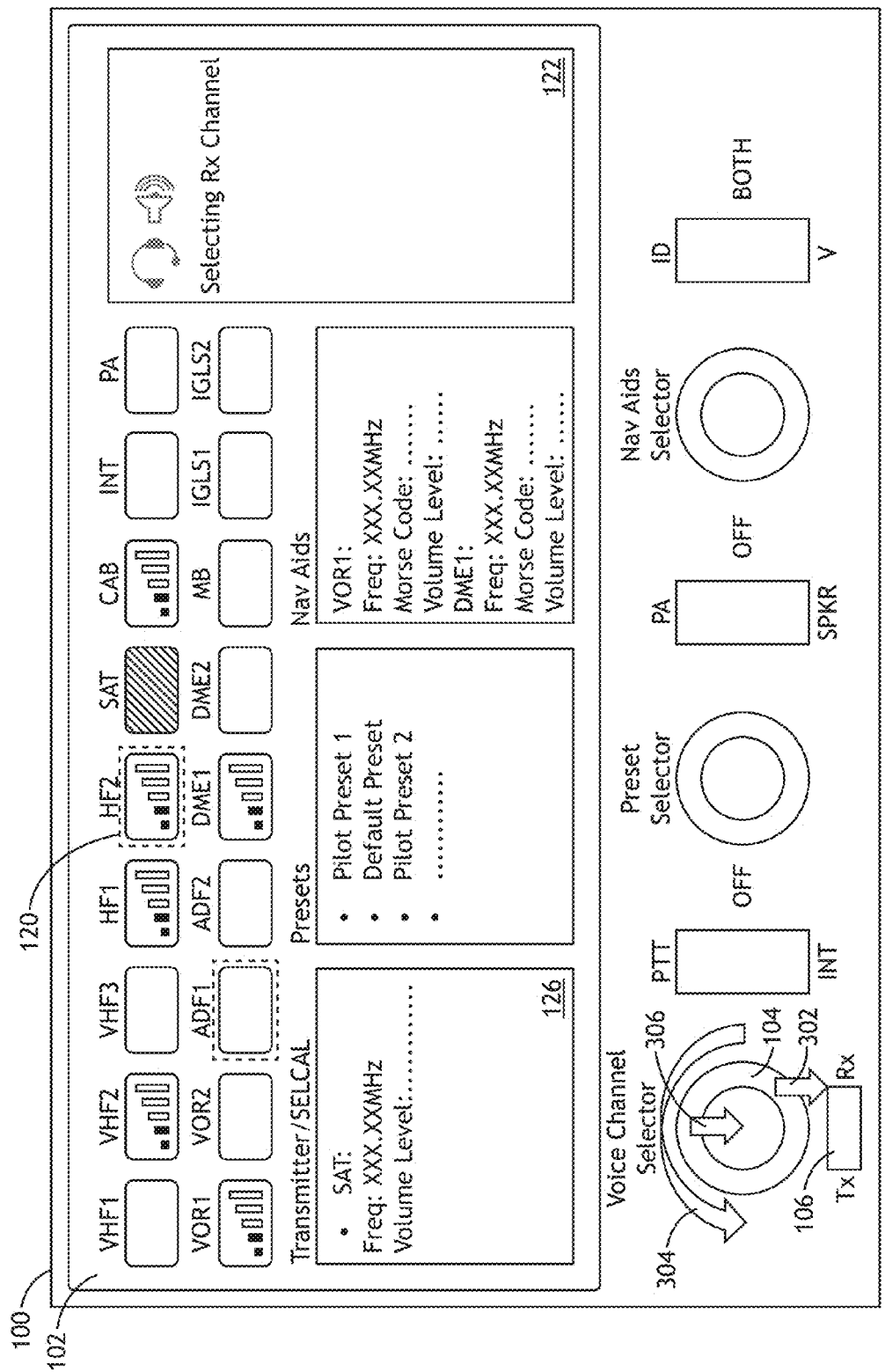
FIG. 3 is an illustration depicting selection of a receive channel utilizing an ACP according to an exemplary embodiment of the inventive concepts disclosed herein.

It is also noted that a similar selection process may be utilized to facilitate selection of a receive channel. As shown in FIG. 3, the rocker switch 106 may respond to a user input and switch the ACP 100 to a receive channel selection mode (step 302). Optional status information may be displayed in the status window 122 to provide a visual indication/confirmation to the user of the current selection mode.

While operating in the receive channel selection mode, the outer knob of the double pole rotary selector 104 may respond to a user generated rotation input and move the cursor 120 accordingly (step 304). Suppose the HF2 channel is one of the receive channels the user wants to select, the user may move the cursor 120 over the HF2 channel and press the inner knob of the double pole rotary selector 104 once. The HF2 channel may be selected in response to the press input of the inner knob (step 306) and an indicator may be displayed accordingly.

It is noted that the double pole rotary selector 104 may also provide the user abilities to adjust the volume settings of the selected receive channels. For instance, the inner knob the double pole rotary selector 104 may respond to a rotation input, allowing the user to adjust the volume on a selected receive channel by rotating the inner knob. It is also noted that the steps described above may be repeated a number of times so that a number of receive channels may be selected.

It is further noted the double pole rotary selector 104 may also provide the user abilities to de-selected one or more receive channels in a similar manner. More specifically, the outer knob of the double pole rotary selector 104 may respond to a user generated rotation input and move the cursor 120 to a receive channel that needs to be de-selected. Once the cursor 120 is moved over the receive channel that needs to be de-selected, the user may press the inner knob of the double pole rotary selector 104 once and the receive channel may be de-selected in response to the press input of the inner knob. In other words, the press input of the inner knob of the double pole rotary selector 104 may toggle between selecting and de-selecting a receive channel; a receive channel selection indicator may be displayed for the channel when it is selected, and the receive channel selection indicator may be removed when that channel is de-selected.

Figure 4:
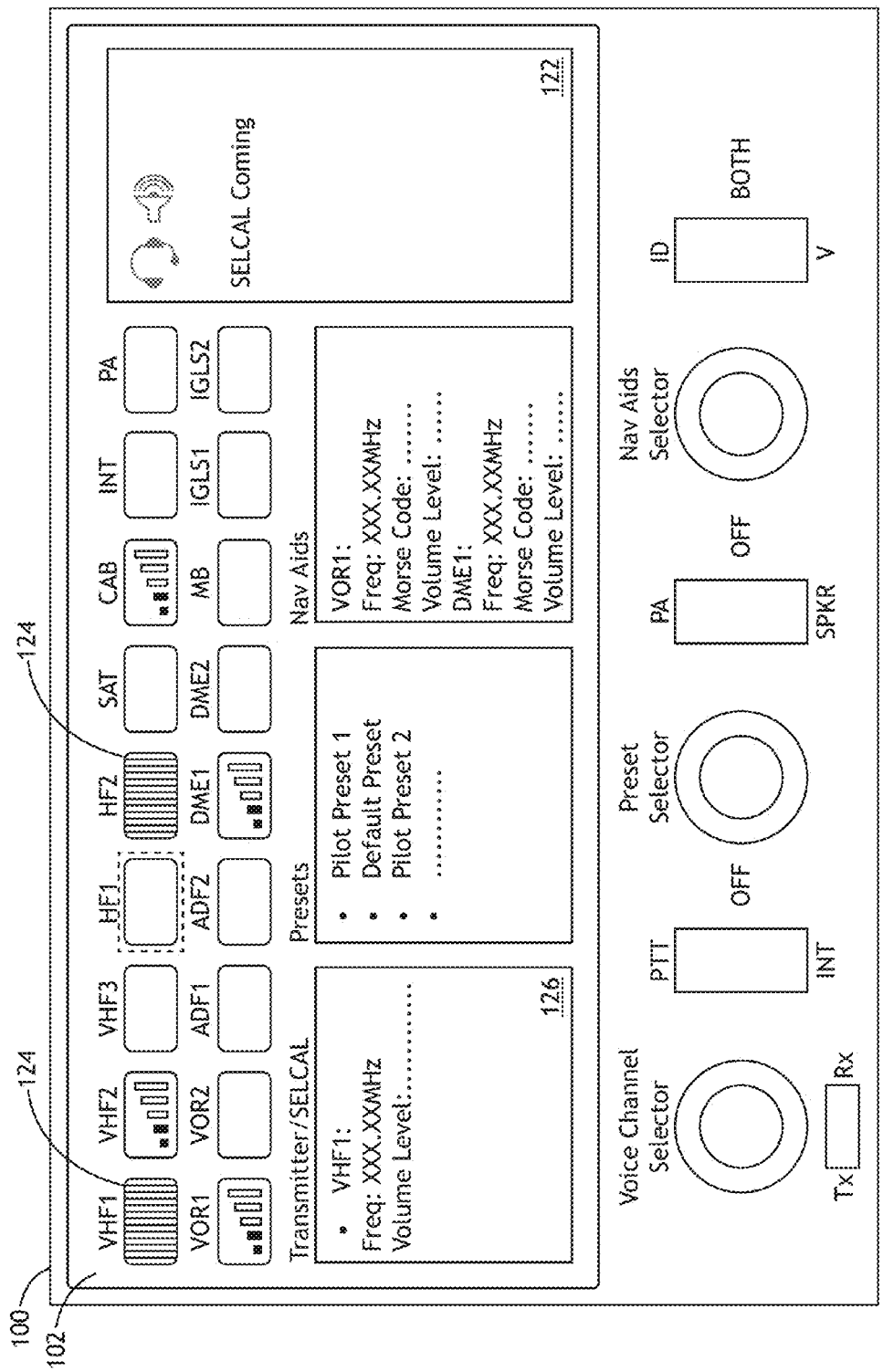
FIG. 4 is an illustration depicting indication of SELCAL channels utilizing an ACP according to an exemplary embodiment of the inventive concepts disclosed herein.
Figure 5:
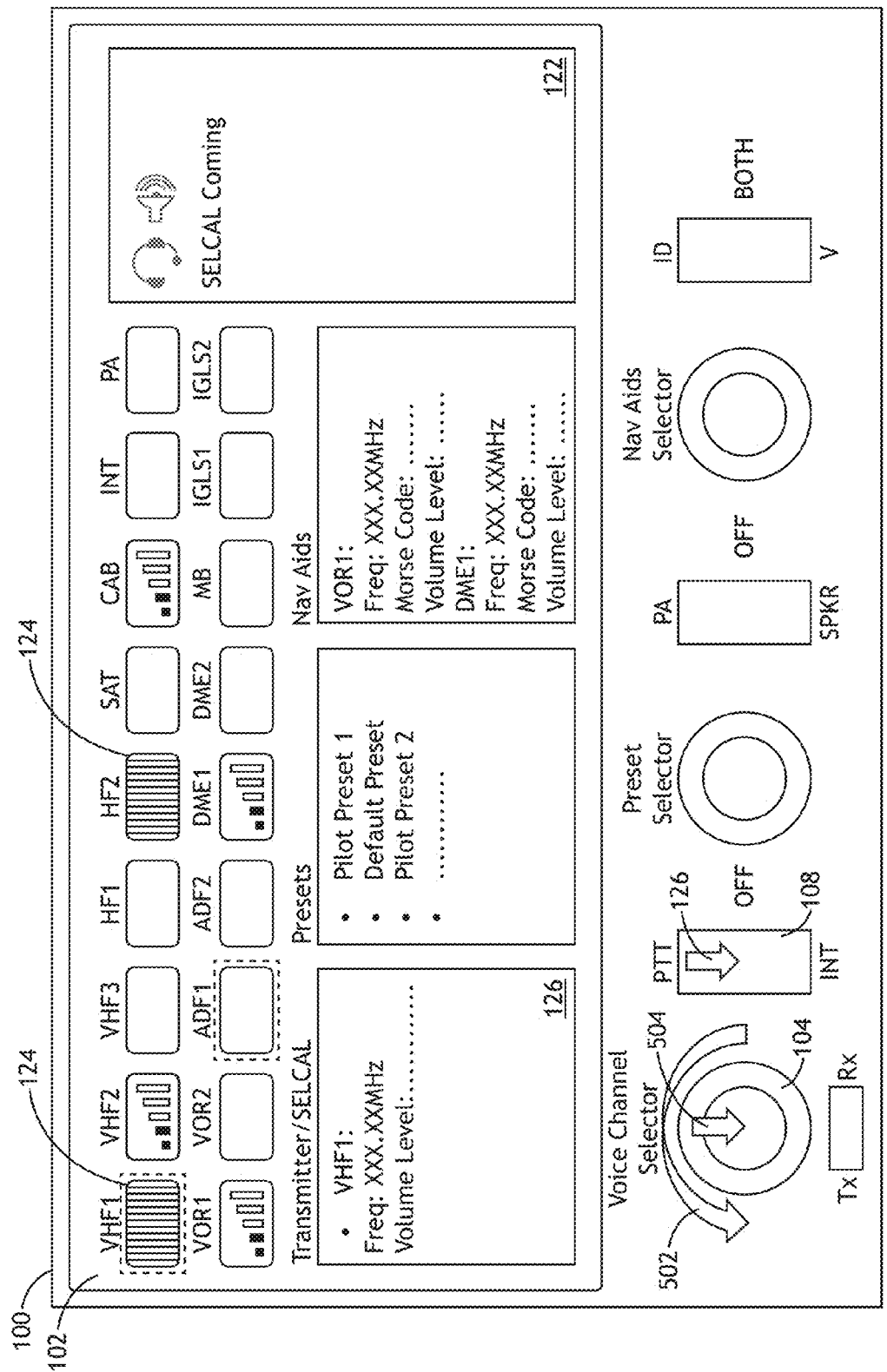
FIG. 5 is an illustration depicting selection of a SELCAL channel utilizing an ACP according to an exemplary embodiment of the inventive concepts disclosed herein.

It is contemplated that the double pole rotary selector 104 may also provide the user abilities to select SELCAL channels. SELCAL is a selective-calling radio system that can notify the user that a ground radio station wishes to communicate with the aircraft. An incoming SELCAL typically specifies a list of channels that may be used for handling SELCAL transmissions, and the user is typically required to select a SELCAL transmission channel from the specified list of channels. FIGS. 4 and 5 are illustrations showing how the ACP 100 may be configured to handle an incoming SELCAL and to facilitate the selection of a SELCAL transmission channel.

For illustrative purposes, suppose the incoming SELCAL specifies that channels VHF1 and/or HF2 may be utilized for SELCAL transmissions. Upon receiving the incoming SELCAL, SELCAL channel indicators 124 may be displayed to identify channels VHF1 and HF2 to the user. It is noted that the SELCAL channel indicators 124 may be visually distinguishable from other channel indicators previously described. For instance, the SELCAL channel indicators 124 may be displayed using different colors and/or shapes, and they may be displayed at different illumination settings (e.g., they may appear to be brighter and/or flashing). It is also noted that an additional notification may be provided in the status window 122 to indicate the incoming SELCAL as well.

Continuing with the examples previously described, the user may use the double pole rotary selector 104 to select one of the SELCAL channels as a SELCAL transmission channel. More specifically, the outer knob of the double pole rotary selector 104 may respond to a user generated rotation input and move the cursor 120 to one of the SELCAL channels (e.g., VHF1 as shown in FIG. 5). Once the cursor 120 is moved over the VHF1 channel (step 502), the user may press the inner knob of the double pole rotary selector 104 to acknowledge and select the VHF1 channel as a SELCAL channel (step 504). In certain implementations, the SELCAL channel indicator 124 associated with the selected SELCAL channel may stop flashing to indicate that the channel has been selected for SELCAL. In addition, detailed information about the selected SELCAL channel (e.g., frequency, volume setting and the like) may also be presented in the information window 126 (if the window is provided), which may serve as a reminder or as a verification for the user.

Similar to the use case presented earlier for selecting a transmission channel, once the SELCAL channel is selected, the user may press and hold the PTT momentary button on the rocker switch 108 and talk over the selected SELCAL channel (step 506). It is to be understood, however, that the PTT momentary button as shown is merely exemplary and is not required in certain implementations. For instance, if the flightstick of an aircraft is designed to include an integrated PTT control, the ACP 100 of that aircraft may not need to provide a dedicated PTT momentary button on the rocker switch 108. For illustrative purposes, however, the PTT momentary button is shown herein to indicate PTT as one of the various operations supported by the ACP 100 in accordance with the inventive concepts disclosed herein.

Figure 6:
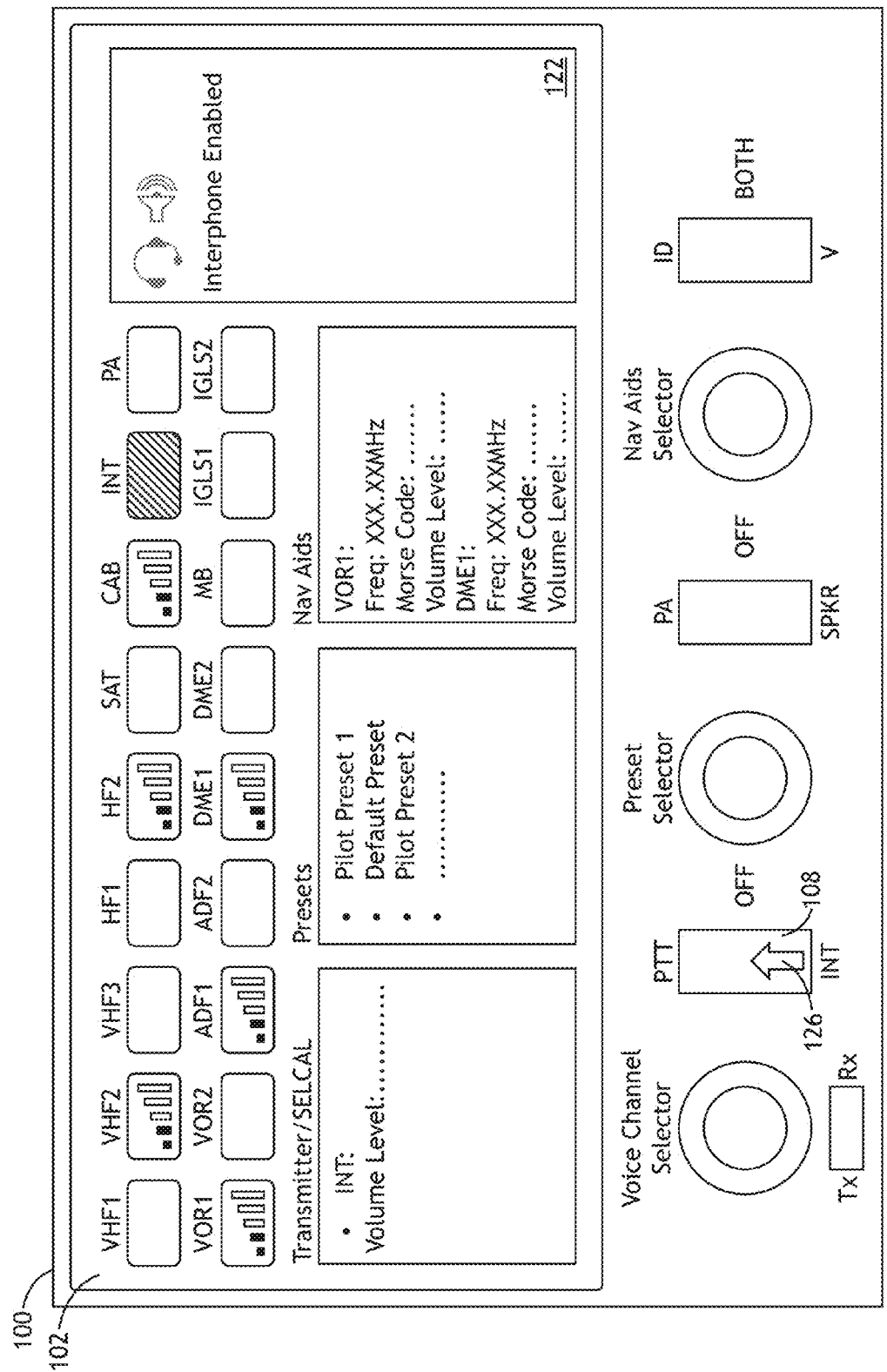
FIG. 6 is an illustration depicting push to talk and interphone functions provided utilizing an ACP according to an exemplary embodiment of the inventive concepts disclosed herein.

Also shown on the rocker switch 108 is another operation supported by the ACP 100, namely the interphone (INT). The user may latch the rocker switch 108 to the INT position to enable the interphone system available on the aircraft. In certain implementations, as shown in FIG. 6, a notification (e.g. "interphone enabled") may be provided in the status window 122 when the interphone system is enabled. The interphone system may be disabled when the rocker switch 108 is switch to the OFF position. The notification (e.g., "interphone enabled") displayed on the status window 122 may be removed when the interphone system is disabled.

Figure 7:
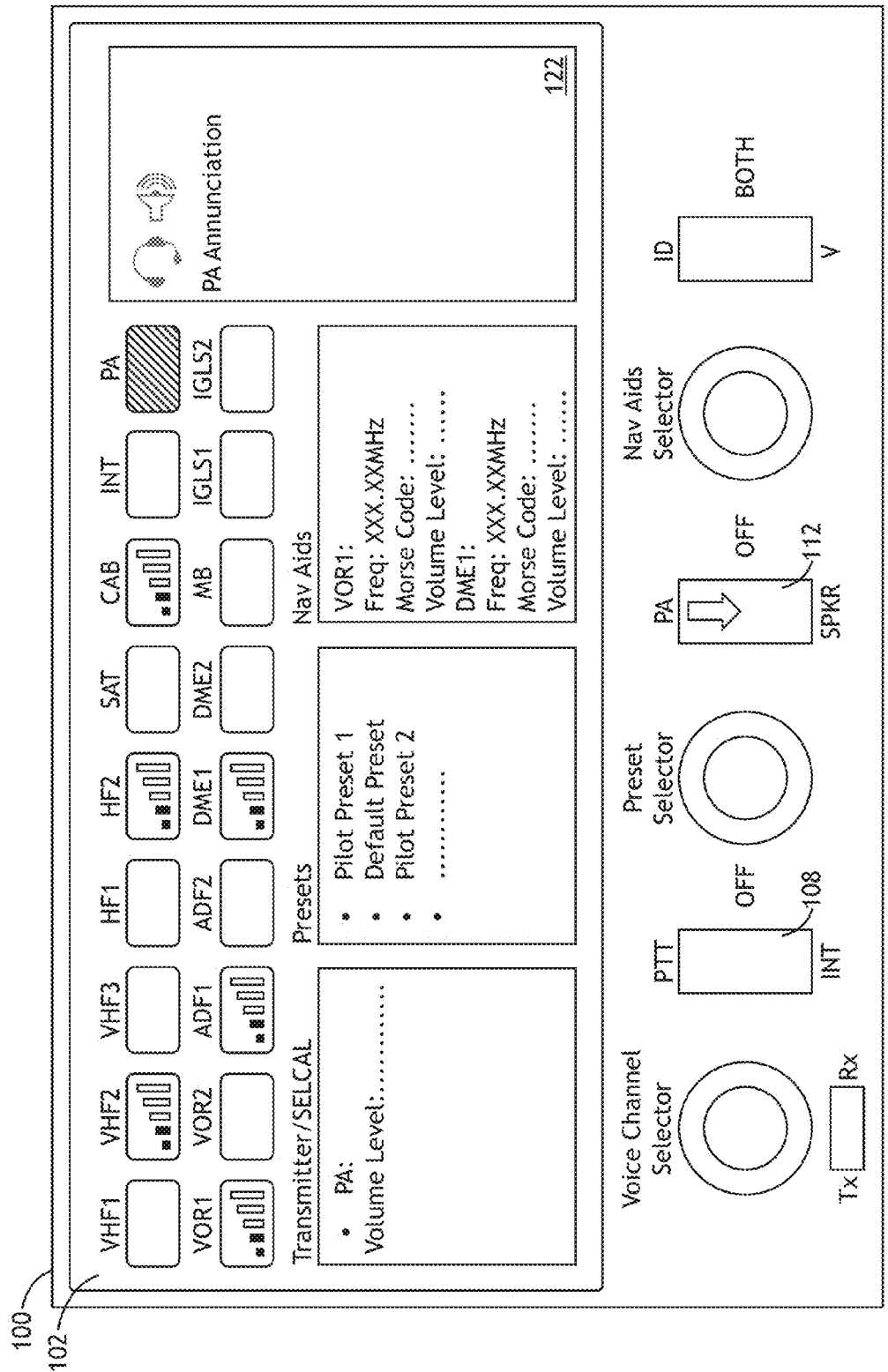
FIG. 7 is an illustration depicting a public announcement function provided utilizing an ACP according to an exemplary embodiment of the inventive concepts disclosed herein.
Figure 8:
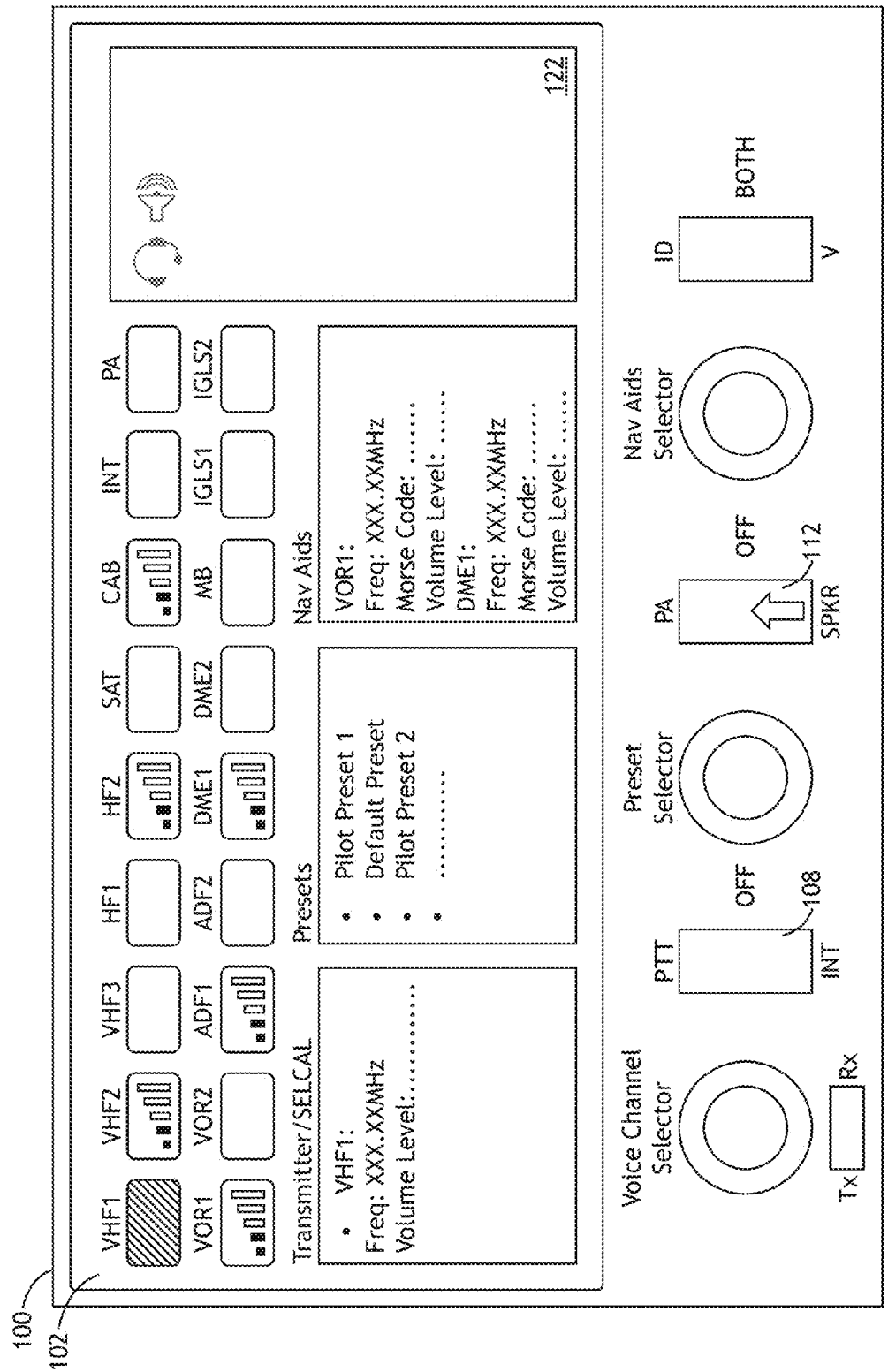
FIG. 8 is an illustration depicting a speaker function provided utilizing an ACP according to an exemplary embodiment of the inventive concepts disclosed herein.

FIGS. 7 and 8 are illustrations depicting another rocker switch 112 that may be configured in a manner similar to the rocker switch 108. More specifically, the rocker switch 112 may provide a public announcement (PA) momentary button. It is noted that both the PA button and the PTT button (described above) may be implemented as momentary buttons to avoid accidental transmission. If the PA momentary button of the rocker switch 112 is pressed and held by the user, the PA system on the aircraft may be engaged, allowing the user to make public announcement. It is also noted that one or more visual indications may be displayed on the display 102 to serve as additional reminders to the user. For example, as shown in FIG. 7, "PA" may be listed as one of the voice channels, which may be indicated as active when the PA button is pressed and held. Similarly, a notification (e.g. "PA annunciation") may also be provided in the status window 122 when the PA system is engaged.

Also shown on the rocker switch 112 is another operation supported by the ACP 100, namely the speaker (SPKR). When SPKR switch is latched, a cockpit speaker system may be enabled and input audio may be heard via both headsets and the cockpit speaker system simultaneously. In certain implementations, as shown in FIG. 8, a notification (e.g. a speaker icon) may be displayed (or highlighted) in the status window 122 when the speaker system is enabled. The speaker system may be disabled when the rocker switch 112 is switch to the OFF position. The notification (e.g. a speaker icon) displayed in the status window 122 may be removed (or dimmed) when the speaker system is disabled. It is to be understood that the exemplary speaker icon shown in FIG. 8 illustrates that the notification(s) displayed in the status window 122 may be graphic-based instead of (or in addition to) the text-based notifications previously presented. It is also to be understood that the graphic- and/or text-based notifications depicted herein are not meant to be limiting and they may vary without departing from the broad scope of the inventive concepts disclosed herein.

Figure 9:
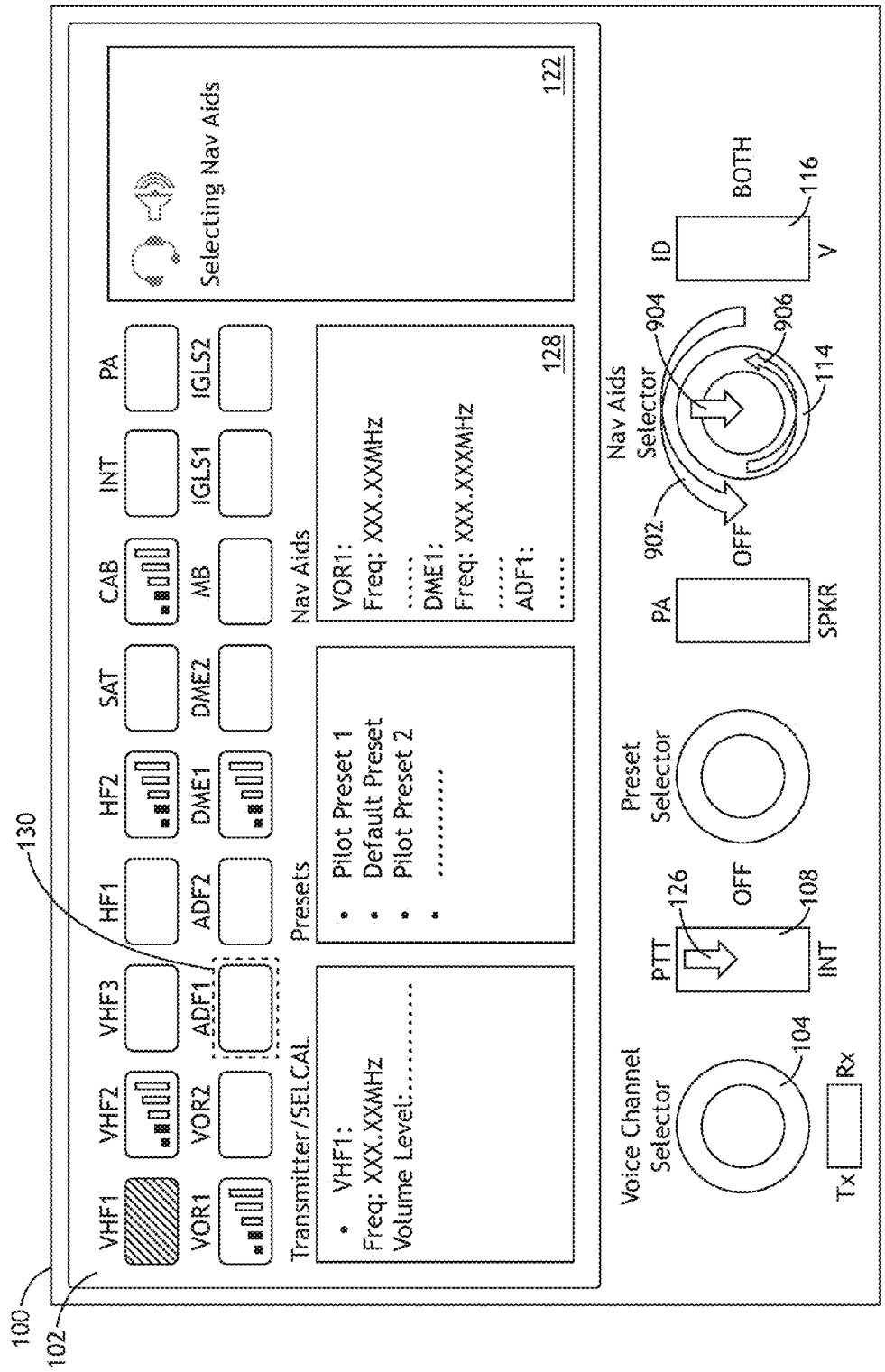
FIG. 9 is an illustration depicting selection of a navigation channel utilizing an ACP according to an exemplary embodiment of the inventive concepts disclosed herein.

It is noted that while the examples described above are related to operations that can be performed on various voice channels supported by the ACP 100, similar support may be provided for navigation channels as well. For instance, as shown in FIG. 9, another double pole rotary selector 114 may be utilized to provide a control interface that facilitates selection/de-selection of navigation channels in a manner similar to that provided by the double pole rotary selector 104 for voice channels. More specifically, the outer knob of the double pole rotary selector 114 may respond to a user generated rotation input to control a cursor 130 that can move across the various navigation channels (step 902). The user may press the inner knob of the double pole rotary selector 114 once when the cursor 130 is moved over a desired navigation channel and in response to the press input of the inner knob, the desired navigation channel may be selected (step 904).

It is noted that steps 902 and 904 may be repeated a number of times so that a number of navigation channels may be selected. In addition, detailed information about the selected navigation channel (e.g., frequency, volume setting and the like) may be presented in the information window 128 (if the window is provided), which may serve as a reminder or as a verification for the user.

It is contemplated that voice input may also be enabled for the selected navigation channels. For instance, the ACP 100 may include a rocker switch 116 that may selectively enable an identification (ID) mode, a voice (V) mode, or both (BOTH). If the ID mode is enabled (e.g., by latching the ID end of the rocker switch 116), all but Morse code on the selected navigation channels may be filtered out, allowing the user to only hear the Morse code. If the V mode is enabled (e.g., by latching the V end of the rocker switch 116), all but voice tones on the selected navigation channels may be filtered out, allowing the user to only hear the voice tones. If both the ID mode and the V mode are enabled (e.g., by putting the rocker switch 116 to the BOTH position), both Morse code and voice tones may be heard.

It is contemplated that the volume settings of the selected navigation channels may be adjusted in a manner similar to voice channel volume adjustments previously described. For instance, the inner knob of the double pole rotary selector 114 may be configured to adjust the volume setting on a particular navigation channel identified by the cursor 130 in response to a rotation input generated by the user (step 906). Likewise, the inner knob of the double pole rotary selector 114 may also be configured to respond to press input in the same manner as previously described, allowing the inner knob of the double pole rotary selector 114 to be pressed to select/de-select a particular navigation channel based on the location of the cursor 130.

It is noted that a reason to provide two separate cursors 120 and 130 is to reduce the user's workload when moving the cursor(s) among the multiple channels. For instance, the cursor 130 may be dedicated to navigation channels and may therefore only be moved along the navigation channel row, allowing the user to focus on navigation channel selection without being concerned whether the cursor 130 would be unintentionally moved to the voice channel row and vice versa. It is to be understood, however, that the number of cursors shown in the figures is merely exemplary. It is contemplated that the number of cursors may be increased or decreased as appropriate for specific application(s) without departing from the broad scope of the inventive concepts disclosed herein.

It is also contemplated that the cursors 120 and 130 may be hidden (or conditionally disengaged) if no outer knob rotation input is detected after a predetermined number of seconds (e.g., 5 seconds). In certain implementation, if the voice channel selection cursor 120 is conditionally disengaged, for example, the inner knob rotation of the double pole rotary selector 104 may be utilized to adjust overall volume of all monitored voice channels. Similarly, if the navigation channel selection cursor 130 is conditionally disengaged, the inner knob rotation of the double pole rotary selector 114 may be utilized to adjust overall volume of all monitored navigation channels. If both cursors 120 and 130 are conditionally disengaged, the inner knob rotation of either double pole rotary selector 104 or 114 may be utilized to adjust overall volume of all monitored voice and navigation channels. It is contemplated that the volume settings adjusted in this manner may be applied to headsets and/or cockpit speakers, depending on whether the rocker switch 112 is latched on the SPKR position or not.

It is to be understood that the various use cases presented above are merely exemplary and are not meant to be limiting. These use cases demonstrated that a software configurable ACP in accordance with the inventive concepts disclosed herein may effectively provide all of the operations needed in order to facilitate the selection and use of the various communication channels. Additionally, because the hardware control elements are configured to be channel-independent, they do not need to be changed even if certain channels need to be changed (e.g., added, replaced, or removed). Further, the software configurable nature of the ACP in accordance with the inventive concepts disclosed herein may support additional customizations that may be appreciated in certain applications. For instance, various customizable icons, indicators, typefaces, graphics, color settings, logos and the like may be implemented without requiring any changes to the ACP hardware, which may help reduce production costs and avoid unnecessary certification processes.

Figure 10:
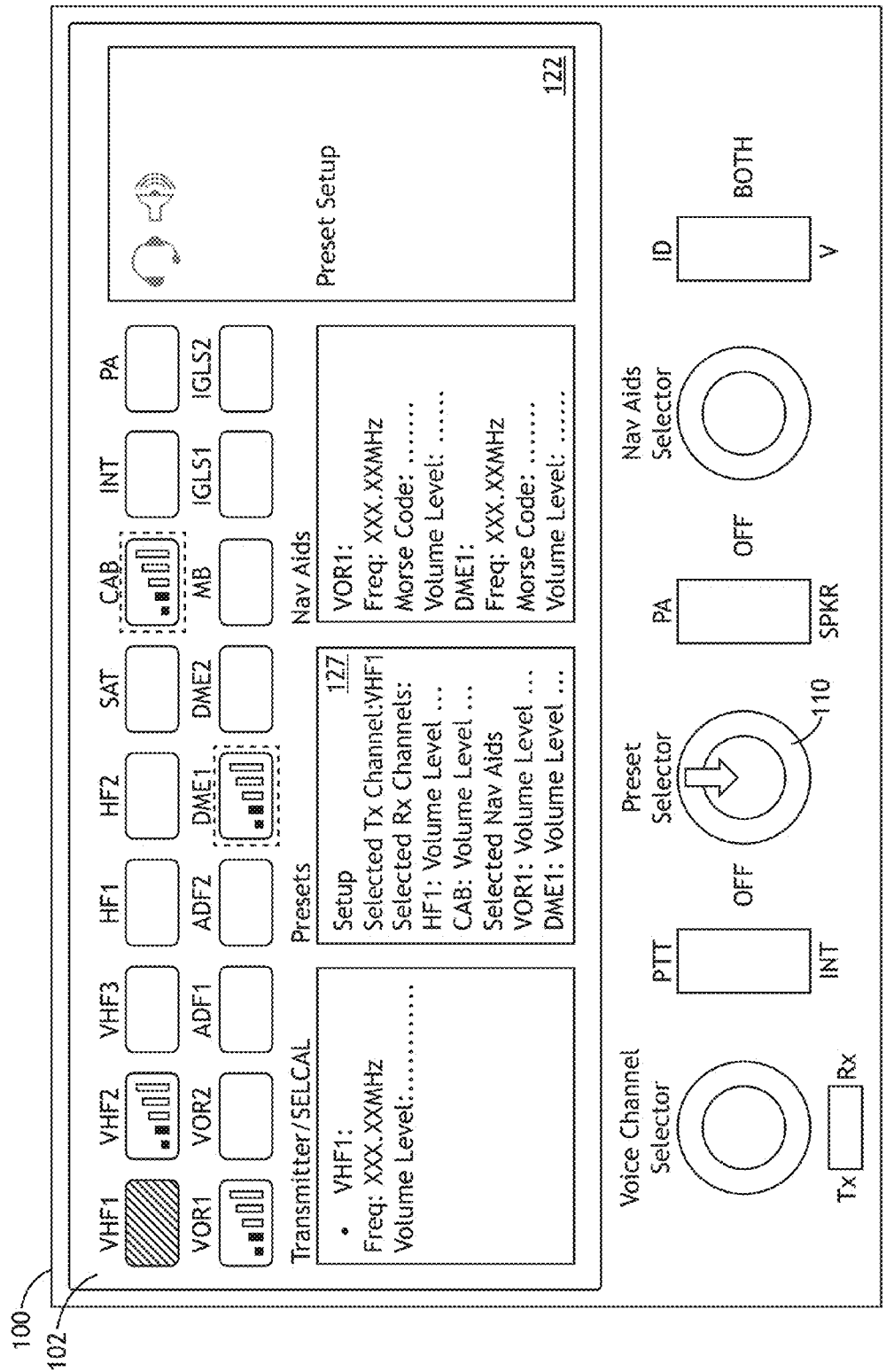
FIG. 10 is an illustration depicting configuration of a predefined setting utilizing an ACP according to an exemplary embodiment of the inventive concepts disclosed herein.

It is also contemplated that ACPs in accordance with the inventive concepts disclosed herein may be configured to provide additional features that may further enhance the channel selection process. For instance, FIGS. 10-16 are illustrations depicting a preset selector 110 that may be included on the faceplate of the ACP 100 to provide a preset feature that may further enhance the channel selection process. The preset selector 110 may be implemented as a double pole rotary selector, where the inner knob of the double pole rotary selector 110 may be configured to initiate a preset setup mode if it is pressed and held for a predetermined number of seconds (e.g., 5 seconds). In certain implementations, as shown in FIG. 10, a notification (e.g. "preset setup") may be displayed in the status window 122 to provide a visual indication to the user that the ACP 100 is now operating under the preset setup mode.

Once in the preset setup mode, the user may select the channels and the volume settings using the same selection processes previously described. Information regarding the selected channels may be displayed in a preset display window 127 as shown in FIG. 10, and once the selection is confirmed, the user may press the inner knob of the double pole rotary selector 110 to save the selected channels. It is contemplated that the selected channels may be saved into a memory device accessible to the ACP 100, allowing the selected channels to be used as a preset configuration in the future. It is also contemplated that a plurality of preset configurations may be setup in this manner, allowing the user to setup multiple preset configurations ahead of time and to quickly select one of them to use without having to manually repeat the selection processes over and over again. It is further contemplated that certain common preset configurations may also be provided by default as a part of the ACP 100 without departing from the broad scope of the inventive concepts disclosed herein.

Figure 11:
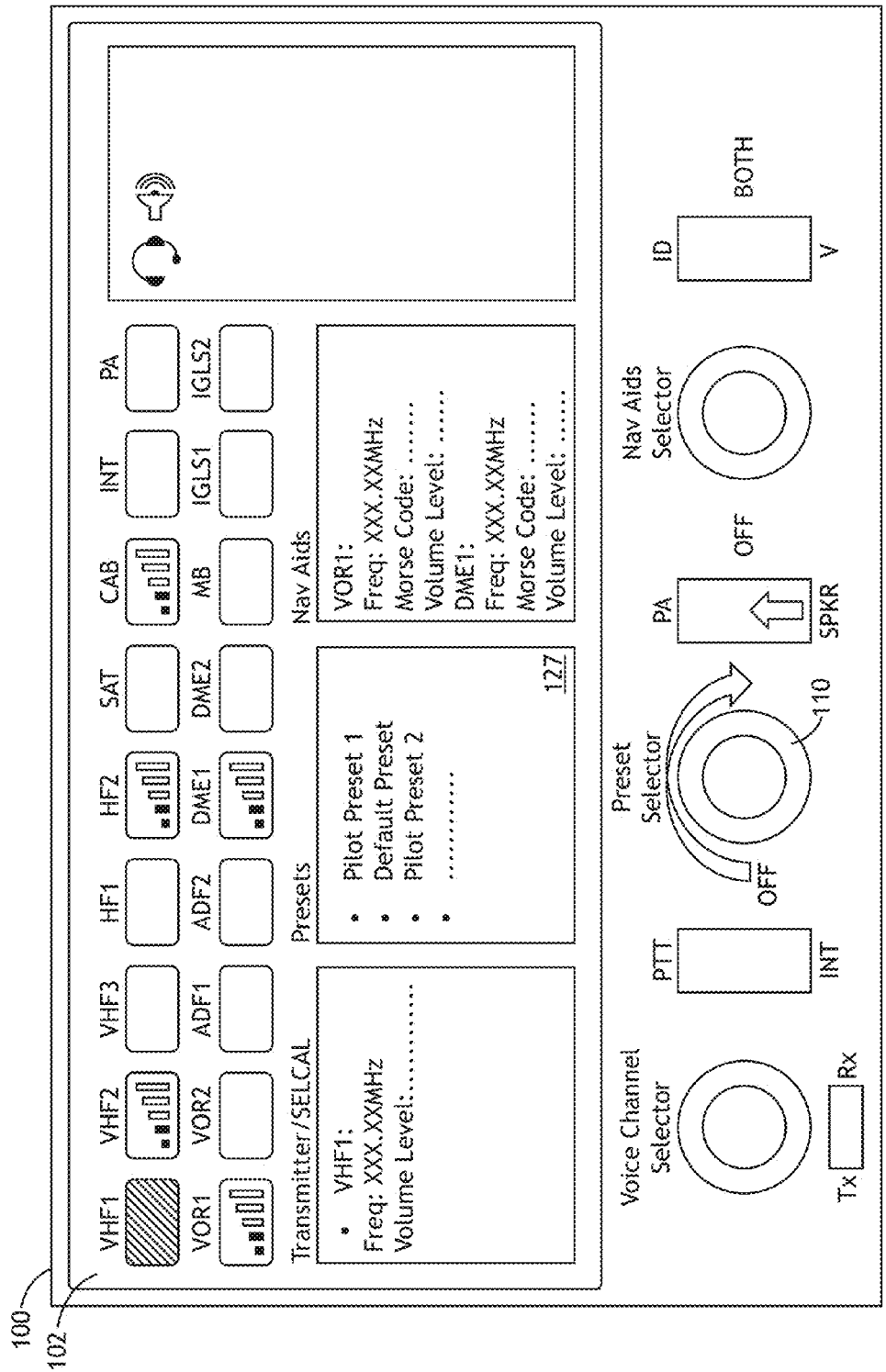
FIG. 11 is an illustration depicting selection of a predefined setting for activation utilizing an ACP according to an exemplary embodiment of the inventive concepts disclosed herein.
Figure 12:
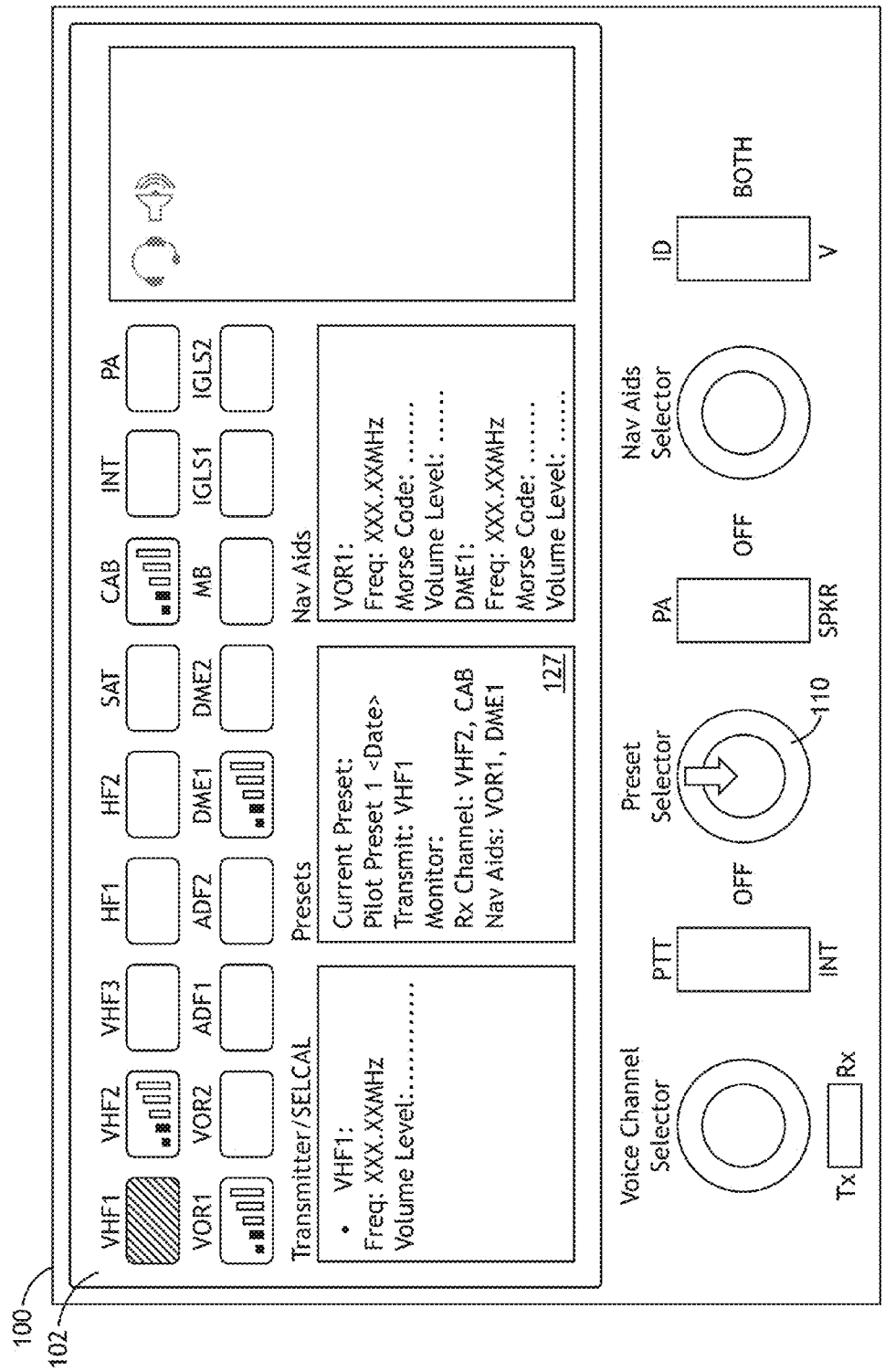
FIG. 12 is an illustration depicting activation of a predefined setting utilizing an ACP according to an exemplary embodiment of the inventive concepts disclosed herein.

FIG. 11 shows a list of available preset configurations, which may be presented in the preset display window 127 for the user to choose. In certain implementations, the outer knob of the double pole rotary selector 110 may respond to a user generated rotation input and highlight (e.g., using a different color, typeface, font size or the like) one of the preset configurations accordingly. The user may rotate the outer knob of the double pole rotary selector 110 until the desired preset configuration is highlighted and press the inner knob of the double pole rotary selector 110 to active the highlighted preset configuration. The highlighted preset configuration may then be activated in response to the press input of the inner knob, allowing the channel selections specified in the highlighted preset configuration to be applied and indicated accordingly, as shown in FIG. 12.

Figure 13:
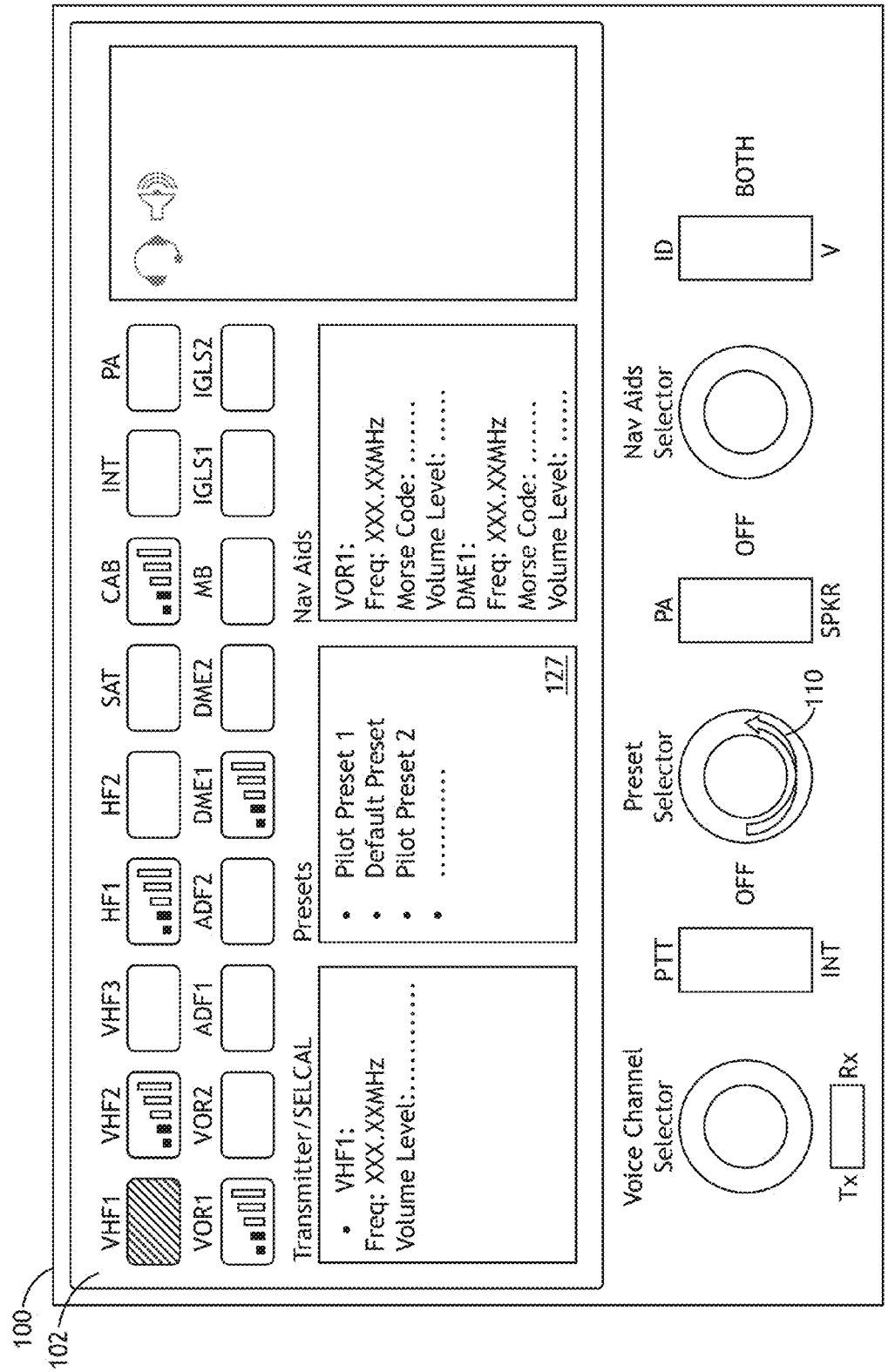
FIG. 13 is an illustration depicting selection of a predefined setting for deletion utilizing an ACP according to an exemplary embodiment of the inventive concepts disclosed herein.
Figure 14:
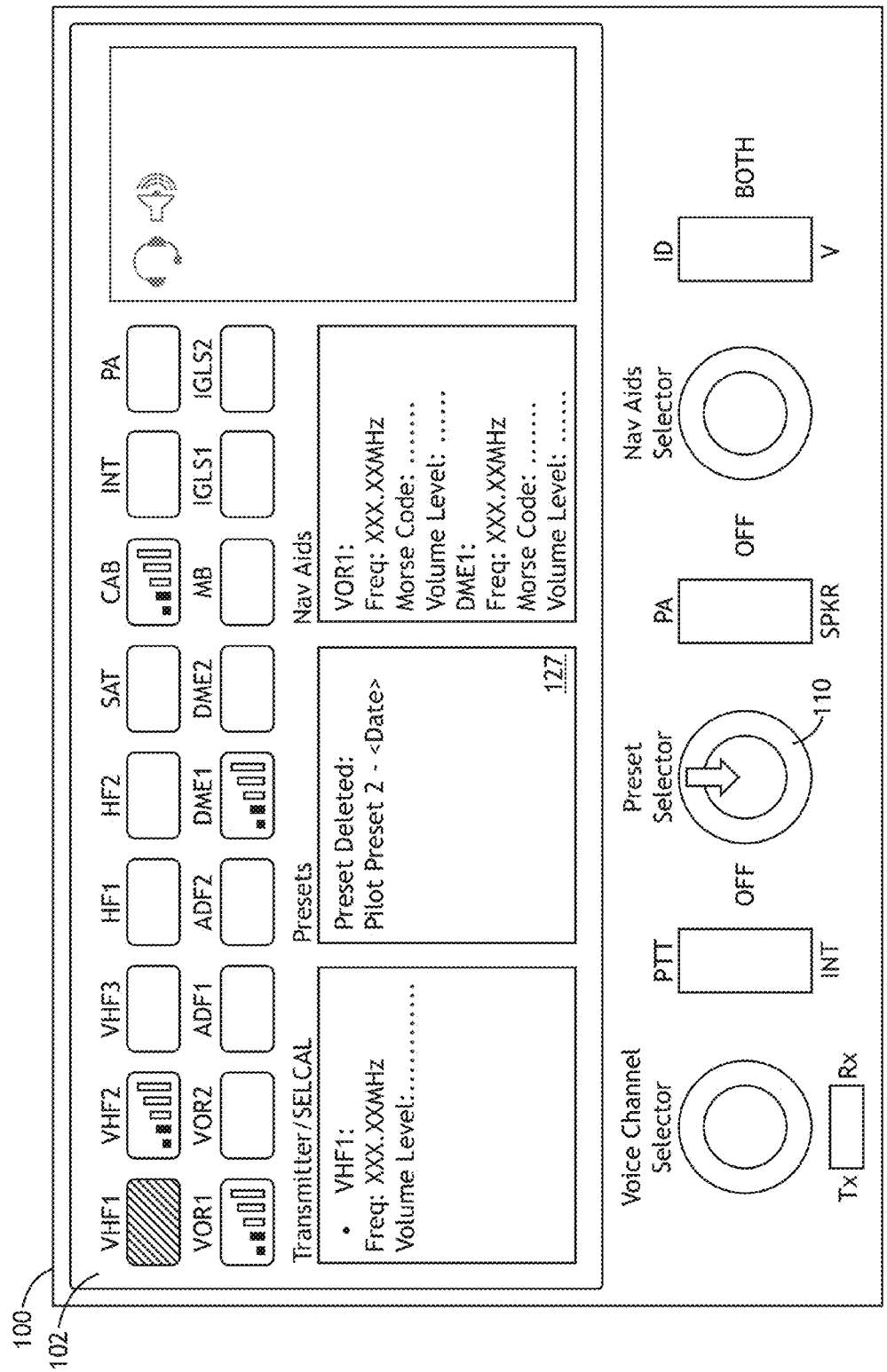
FIG. 14 is an illustration depicting deletion of a predefined setting utilizing an ACP according to an exemplary embodiment of the inventive concepts disclosed herein.
Figure 15:
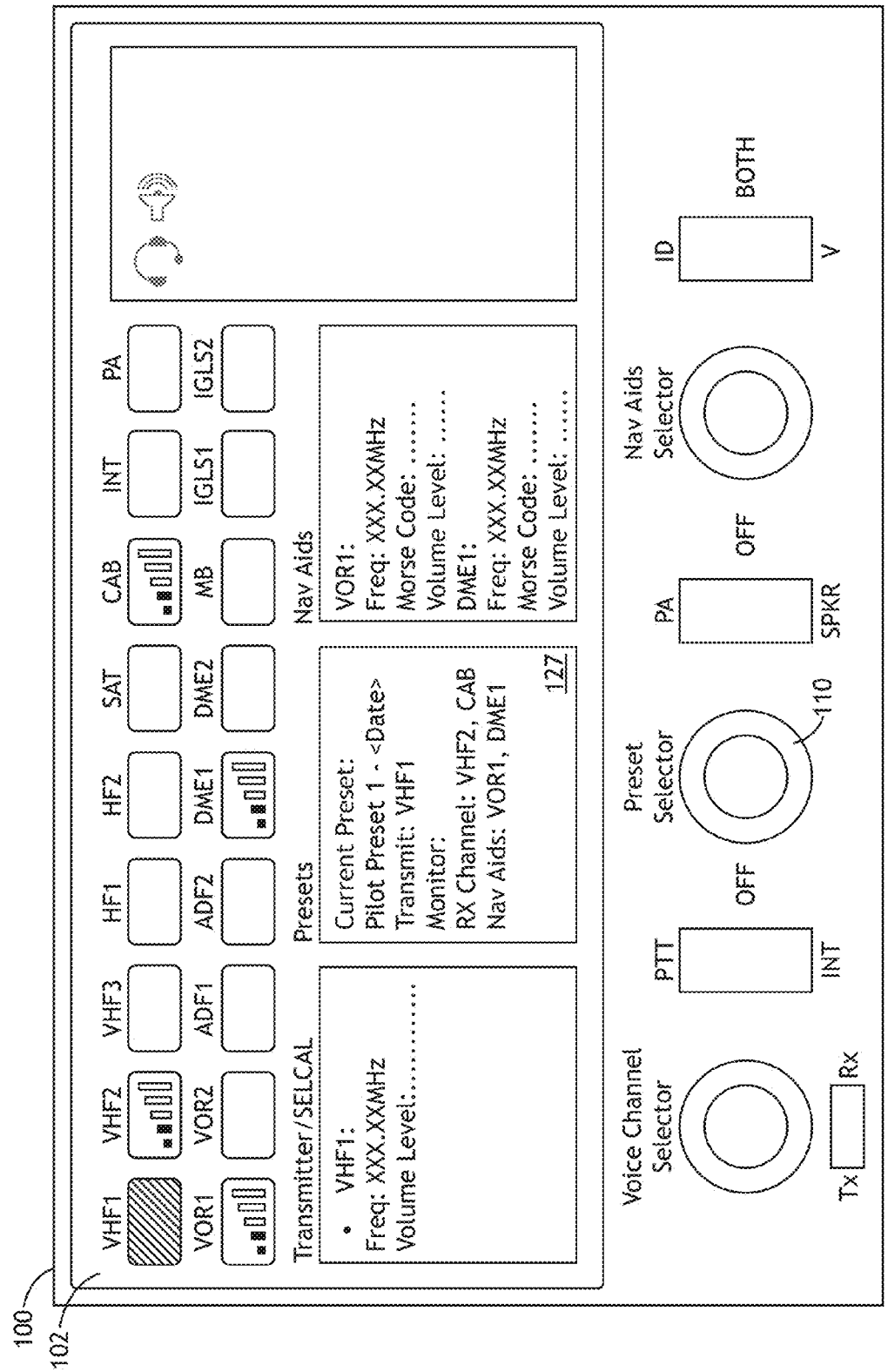
FIG. 15 is an illustration depicting operations of an ACP after deletion of a predefined setting according to an exemplary embodiment of the inventive concepts disclosed herein.

It is contemplated that preset configurations may also be deleted from the list of available preset configurations. As shown in FIG. 13, the inner knob of the double pole rotary selector 110 may also respond to a user generated rotation input and highlight (e.g., using a different color, typeface, font size or the like) one of the preset configurations accordingly. The user may rotate the inner knob of the double pole rotary selector 110 until a preset configuration that needs to be deleted is highlighted. The user may then press the inner knob of the double pole rotary selector 110 to delete the highlighted preset configuration. It is contemplated that in certain implementations, a deletion confirmation may be displayed (e.g., "preset deleted" as shown in the preset display window 127 in FIG. 14) for a predetermined amount of time (e.g., 5 seconds), after which normal operations may resume as shown in FIG. 15.

Figure 16:
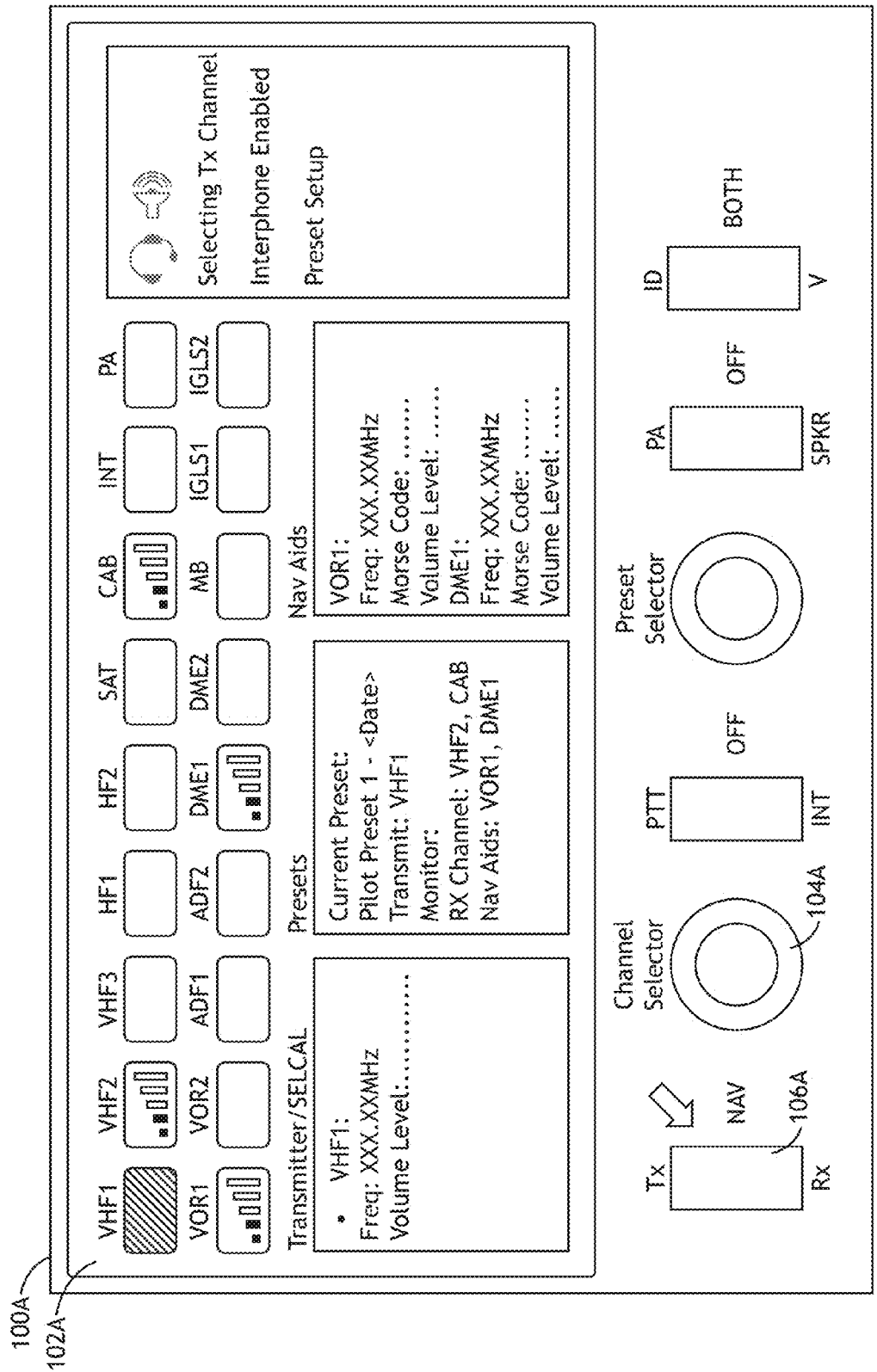
FIG. 16 is an illustration depicting a faceplate of an ACP according to another exemplary embodiment of the inventive concepts disclosed herein.

It is to be understood that the hardware control elements 104-116 described above are merely exemplary and are not meant to be limiting. It is contemplated that various other types of selectors, buttons, and/or switches may be utilized instead of (or in addition to) the double pole rotary selectors and/or rocker switches depicted above. It is also contemplated that certain hardware control elements described above may be combined to further reduce the number of hardware control elements presented on the faceplate of the ACP. For instance, as shown in FIG. 16, a three-position rocker switch 106A may be used instead of a two-position rocker switch 106 previously presented in FIG. 1. The three-position rocker switch 106A may switch between a transmission channel selection position and a receive channel selection position (similar to that provided by the two-position rocker switch 106), but may also be switched to a navigation channel selection position. It is noted that using the three-position rocker switch 106A may allow the double pole rotary selector 104 (used for voice channel selection) and the double pole rotary selector 114 (used for navigation channel selection) to be merged into one double pole rotary selector 104A, which can be used for both voice and navigation channel selection (controlled based on the position of the rocker switch 106A). It is contemplated that other hardware control elements presented on the faceplate of the ACP 100A may be combined as well without departing from the broad scope of the inventive concepts disclosed herein.

Figure 17:
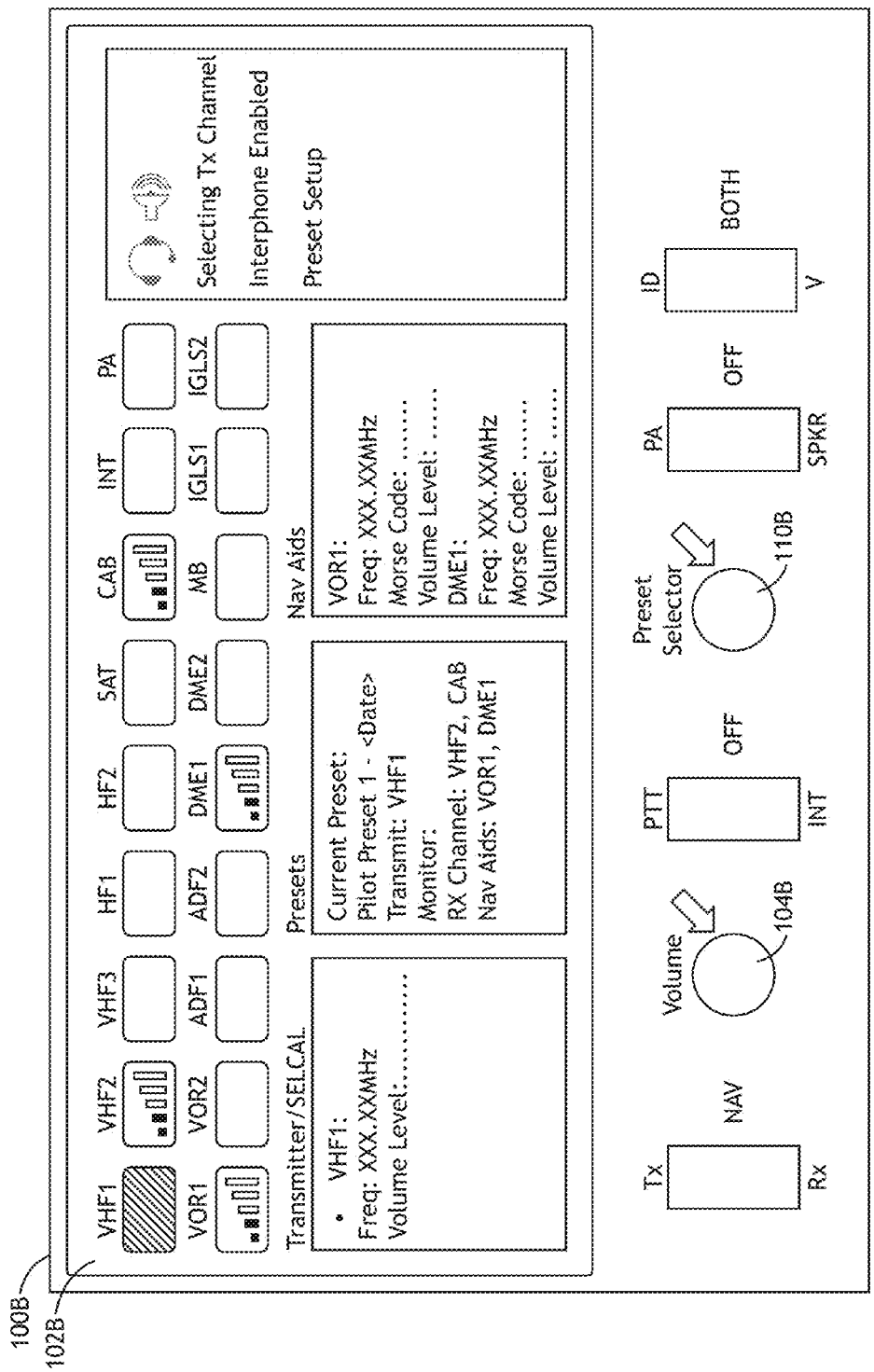
FIG. 17 is an illustration depicting a faceplate of an ACP according to still another exemplary embodiment of the inventive concepts disclosed herein.

It is further contemplated that the displays with touch sensing capabilities may be utilized without departing from the broad scope of the inventive concepts disclosed herein. As shown in FIG. 17, an ACP 100B with a touch screen display 102B may allow the user to select voice and/or navigation channels by interacting directly with the touch screen display 102B, which in turn may allow the various double pole rotary selectors previously described to be implemented as single pole rotary selectors 104B and 110B (which may still be used to control the volumes and select preset configurations). It is contemplated that the user interface provided by the touch screen display 102B may be designed in manners that may further reduce (or significantly eliminate) the need for the rotary selectors and/or other switches shown in FIG. 17. It is to be understood, however, that certain implementations of the ACP 110B may still provide hardware control elements similar to that described above as redundant control mechanisms that may be appreciated in case the touch sensing capabilities of the display 102B fail to function properly.

Figure 18:
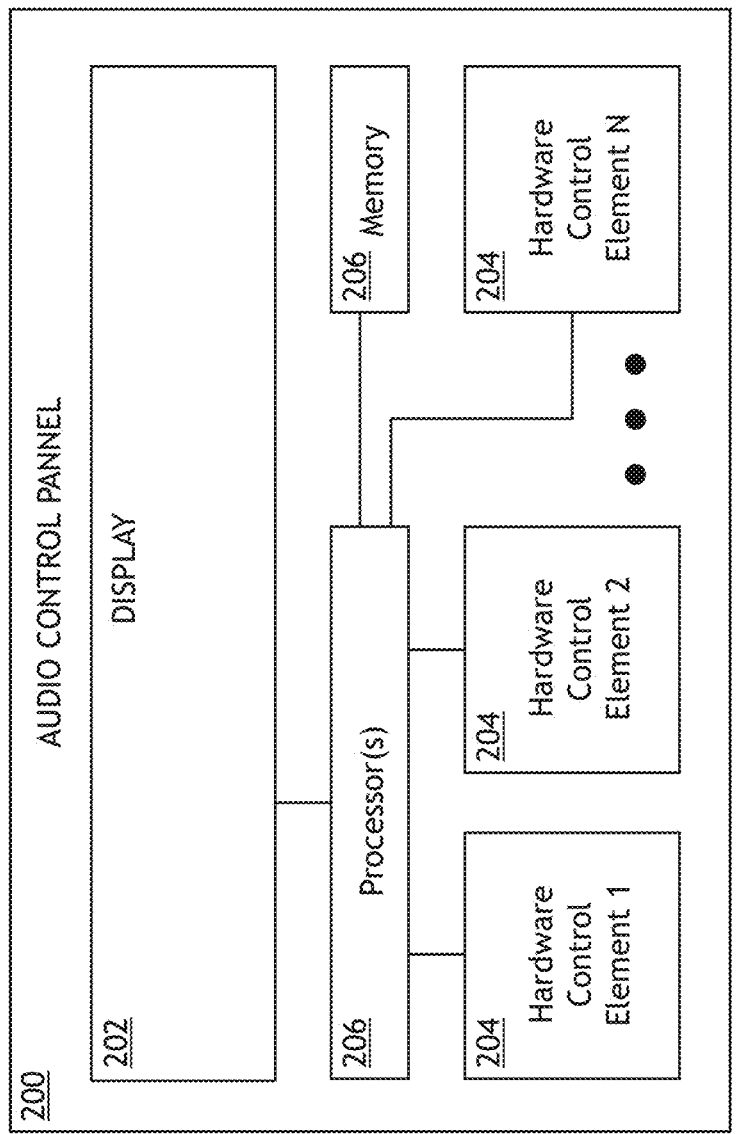
FIG. 18 is a block diagram depicting a software configurable ACP according to an exemplary embodiment of the inventive concepts disclosed herein.

Referring now to FIG. 18, a block diagram depicting a software configurable ACP 200 according to an exemplary embodiment of the inventive concepts disclosed herein is shown. The ACP 200 may include a display 202 working in conjunction with a plurality of hardware control elements 204. The ACP 200 may also include one or more processors 206 (e.g., dedicated processing units, application-specific integrated circuits (ASICs), field-programmable gate arrays (FPGAs) or various other types of processors or processing units) coupled with a non-transitory processor-readable memories 208 configured for storing processor-executable code. When the processor-executable code is executed by the one or more processors 206, the one or more processors 206 may carry out instructions in response to various types of input signals received via the hardware control elements 204 to facilitate selection and use of various communication channels supported by the ACP 200 as previously described.

It is contemplated that the processor-readable memories 208 may also be utilized for storing one or more default or user-defined preset configurations. It is to be understood that the inventive concepts may be conveniently implemented in forms of a software, hardware, or firmware package. It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An aircraft audio control panel, comprising:
    a display configured to provide a first visual indication of a list of available voice channels and a list of navigation channels, and a second visual indication of a list of preset channels comprising a combination of voice and navigation channels predefined by a user;
    a plurality of channel-independent hardware control elements configured to receive a channel selection input from the user, the plurality of channel-independent hardware control elements comprising a first double pole rotary selector configured to select a voice channel of the list of available voice channels, a second double pole rotary selector configured to select a navigation channel of the list of navigation channels, and a third double pole rotary selector configured to select a preset channel of the list of preset channels, wherein the channel selection input is received via one of the first double pole rotary selector, the second double pole rotary selector, and the third double pole rotary selector, wherein the channel selection input includes a first rotation input for moving a position of a cursor, and wherein one of the first visual indication of the list of available voice channels and the list of navigation channels and the second visual indication of the list of preset channels is updated to indicate the position of the cursor in response to the first rotation input; and
    at least one processor in communication with the display and the plurality of channel-independent hardware control elements, the at least one processor configured to process the channel selection input and update one of the visual indication of the list of available voice channels and the list of navigation channels and the second visual indication of the list of preset channels based on the channel selection input.

2. The aircraft audio control panel of claim 1, wherein the channel selection input includes a press input, and wherein the visual indication of the list of available voice channels and the list of navigation channels is updated to indicate a selection or a de-selection of a channel identified by the position of the cursor in response to the press input.

3. The aircraft audio control panel of claim 2, wherein the channel selection input includes a second rotation input for adjusting a volume setting, and wherein the visual indication of the list of available voice channels and the list of navigation channels is updated to indicate a volume setting for the channel identified by the position of the cursor in response to the second rotation input to adjust the volume setting.

4. The aircraft audio control panel of claim 3, wherein the channel selection input is specified for selecting one of: a transmission channel among the list of available voice channels, a receive channel among the list of available voice channels, and a navigation channel among the list of available navigation channels.

5. The aircraft audio control panel of claim 1, wherein the plurality of channel-independent hardware control elements is further configured to facilitate configuration of at least one predefined setting.

6. The aircraft audio control panel of claim 1, wherein the plurality of channel-independent hardware control elements is further configured to activate one of: a push to talk function and an interphone function.

7. The aircraft audio control panel of claim 1, wherein the plurality of channel-independent hardware control elements is further configured to activate one of: a public announcement function and a cockpit speaker function.

8. The aircraft audio control panel of claim 1, wherein the plurality of channel-independent hardware control elements is further configured to activate at least one of: an identification mode and a voice mode for filtering a voice input on a selected navigation channel.

9. The aircraft audio control panel of claim 1, wherein the display is further configured to provide at least one information window for displaying at least one of: a selected transmission channel, a selected navigation channel, a predefined setting, and a status notification.

10. The aircraft audio control panel of claim 1, wherein the at least one processor is further configured to update at least one of the list of available voice channels and the list of navigation channels indicated on the display.

11. An aircraft audio control panel, comprising:
a display configured to provide a first visual indication of a list of available voice channels and a list of navigation channels, and a second visual indication of a list of preset channels comprising a combination of voice and navigation channels predefined by a user;
a plurality of channel-independent hardware control elements configured to receive a channel selection input from the user, the plurality of channel-independent hardware control elements comprising a first double pole rotary selector configured to select a voice channel of the list of available voice channels, a second double pole rotary selector configured to select a navigation channel of the list of navigation channels, and a third double pole rotary selector configured to select a preset channel of the list of preset channels, wherein the channel selection input is received via one of the first double pole rotary selector, the second double pole rotary selector, and the third double pole rotary selector, wherein the channel selection input includes a first rotation input for moving a position of a cursor, and wherein one of the first visual indication of the list of available voice channels and the list of navigation channels and the second visual indication of the list of preset channels is updated to indicate the position of the cursor in response to the first rotation input; and
at least one processor in communication with the display and the plurality of channel-independent hardware control elements, the at least one processor configured to control the list of available voice channels, the list of navigation channels, and the list of preset channels indicated on the display, the at least one processor further configured to process the channel selection input and update one of the visual indication of the list of available voice channels and the list of navigation channels and the second visual indication of the list of preset channels based on the channel selection input.

12. The aircraft audio control panel of claim 11, wherein the channel selection input includes a press input, and wherein the visual indication of the list of available voice channels and the list of navigation channels is updated to indicate a selection or a de-selection of a channel identified by the position of the cursor in response to the press input.

13. The aircraft audio control panel of claim 12, wherein the channel selection input includes a second rotation input for adjusting a volume setting, and wherein the visual indication of the list of available voice channels and the list of navigation channels is updated to indicate a volume setting for the channel identified by the position of the cursor in response to the second rotation input to adjust the volume setting.

14. The aircraft audio control panel of claim 11, wherein the plurality of channel-independent hardware control elements is further configured to facilitate configuration of at least one predefined setting.

15. The aircraft audio control panel of claim 11, wherein the plurality of channel-independent hardware control elements is further configured to activate at least one of: a push to talk function, an interphone function, a public announcement function, and a cockpit speaker function.

16. The aircraft audio control panel of claim 11, wherein the plurality of channel-independent hardware control elements is further configured to activate at least one of: an identification mode and a voice mode for filtering a voice input on a selected navigation channel.

17. An aircraft audio control panel, comprising:
a display configured to provide a first visual indication of a list of available voice channels and a list of navigation channels, and a second visual indication of a list of preset channels comprising a combination of voice and navigation channels predefined by a user;
a plurality of channel-independent hardware control elements configured to receive a channel selection input from the user, the plurality of channel-independent hardware control elements comprising a first double pole rotary selector configured to select a voice channel of the list of available voice channels, a second double pole rotary selector configured to select a navigation channel of the list of navigation channels, and a third double pole rotary selector configured to select a preset channel of the list of preset channels, wherein the channel selection input is received via one of the first double pole rotary selector, the second double pole rotary selector, and the third double pole rotary selector, wherein the channel selection input is specified for selecting at least one of: a transmission channel among the list of available voice channels, a receive channel among the list of available voice channels, and a navigation channel among the list of available navigation channels, wherein the channel selection input includes a first rotation input for moving a position of a cursor, and wherein one of the first visual indication of the list of available voice channels and the list of navigation channels and the second visual indication of the list of preset channels is updated to indicate the position of the cursor in response to the first rotation input; and
at least one processor in communication with the display and the plurality of channel-independent hardware control elements, the at least one processor configured to control the list of available voice channels, the list of navigation channels, and the list of preset channels indicated on the display, the at least one processor further configured to process the channel selection input and update one of the visual indication of the list of available voice channels and the list of navigation channels and the second visual indication of the list of preset channels based on the channel selection input.

* * * * *